US 9,734,485 B2

(12) United States Patent
Sahai et al.

(10) Patent No.: US 9,734,485 B2
(45) Date of Patent: Aug. 15, 2017

(54) METHOD AND APPARATUS FOR PROVIDING A CONTEXTUAL TIMELINE OF AN ONLINE INTERACTION FOR USE IN ASSESSING EFFECTIVENESS

(71) Applicant: Adobe Systems Incorporated, San Jose, CA (US)

(72) Inventors: Swapnil Sahai, Lucknow (IN); Himanshu Sawhney, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 259 days.

(21) Appl. No.: 14/448,544

(22) Filed: Jul. 31, 2014

(65) Prior Publication Data

US 2016/0034111 A1    Feb. 4, 2016

(51) Int. Cl.
*G06F 3/048*    (2013.01)
*G06Q 10/10*    (2012.01)

(52) U.S. Cl.
CPC .................................... *G06Q 10/10* (2013.01)

(58) Field of Classification Search
CPC .. G06Q 10/10; G06Q 10/107; H04L 65/4038; H04M 3/56; H04N 7/15
See application file for complete search history.

(56) References Cited

U.S. PATENT DOCUMENTS

| | | | | |
|---|---|---|---|---|
| 2002/0143877 A1* | 10/2002 | Hackbarth | ........... | G06Q 10/107 709/205 |
| 2007/0100939 A1* | 5/2007 | Bagley | ................... | G06Q 10/10 709/204 |
| 2008/0320082 A1* | 12/2008 | Kuhlke | ............... | H04L 12/1822 709/205 |
| 2009/0138554 A1* | 5/2009 | Longobardi | ........... | G06Q 10/10 709/204 |
| 2011/0029893 A1* | 2/2011 | Roberts | ................... | G06Q 10/10 715/753 |
| 2011/0161834 A1* | 6/2011 | Shadfar | ............... | H04L 65/4038 715/753 |
| 2011/0292162 A1* | 12/2011 | Byun | ....................... | H04N 7/15 348/14.08 |
| 2011/0295392 A1* | 12/2011 | Cunnington | ........... | G06Q 10/10 700/90 |
| 2013/0138749 A1* | 5/2013 | Bohm | ..................... | H04L 51/32 709/206 |

(Continued)

*Primary Examiner* — Rashawn Tillery
(74) *Attorney, Agent, or Firm* — Keller Jolley Preece (57) ABSTRACT

A computer implemented method and apparatus for generating a contextual timeline of an online interaction such as a web conference acquires context, from the perspective of participants in the online interaction, along a timeline. Provided for display to a user is a graphical representation of variations, over at least a portion of the timeline, in participant engagement, attentiveness, attendance and/or some other measure of participant interactivity. Also provided for display to the user are one or more images aligned with one or more corresponding points in time along the timeline. The images provided for display in alignment with the timeline are representative of content presented to the at least one participant at one or more points in time. According to some embodiments, the points in time are user selectable, and the one or more images are provided for display in alignment with the timeline in response to user selections.

20 Claims, 8 Drawing Sheets

(56) References Cited

U.S. PATENT DOCUMENTS

| | | | |
|---|---|---|---|
| 2014/0161244 A1* | 6/2014 | Jones | H04M 3/56 379/202.01 |
| 2014/0164501 A1* | 6/2014 | Herger | H04N 7/15 709/204 |
| 2015/0012844 A1* | 1/2015 | Paulik | H04L 65/1096 715/753 |

* cited by examiner

METHOD AND APPARATUS FOR PROVIDING A CONTEXTUAL TIMELINE OF AN ONLINE INTERACTION FOR USE IN ASSESSING EFFECTIVENESS

BACKGROUND OF THE INVENTION

1. Field of the Invention

Embodiments of the present invention generally relate to the web-based exchange of content such as interactive content or video and, more particularly to a method and apparatus for generating a contextual timeline for use in assessing the effectiveness of the content exchanged and/or the presenter(s) of the same.

2. Description of the Related Art

The costs associated with travel have increased substantially over time. This trend, and the widespread availability of high-speed Internet access, has led many institutions to move their meetings, conferences and video presentations online. A typical use case for web-based tools such as Adobe® Connect™ from ADOBE Systems Incorporated involves a presentation wherein one or more people (referred to herein as "hosts") organize an online interaction, and one or more people present a presentation containing content to a number of interested people (referred to herein as "invited participants" or, simply, "participants"). The online interaction may be a meeting, collaboration, webinar, pre-recorded video, or any other form of multiparty interaction on the web. As used herein, the term "online meeting" is meant to signify any type of multi-party interaction with content delivered over the web whether "live" or generated ahead of time (e.g., a pre-recorded presentation or video).

As with "in-person" meetings, the host(s) and/or presenter(s) associated with an online interaction often rely on feedback voluntarily provided by the participants at the conclusion of the meeting. From the perspective of the host, such feedback can be used to gauge the effectiveness of the presenter. The feedback may even be a determinative factor in whether or not the host invites the presenter back to present again. From the perspective of the presenter, on the other hand, participant feedback could potentially identify aspects of a presentation which need improvement or, in the alternative, aspects which have been well received by one or more participants. In practice, however, few participants (online or otherwise) leave meaningful feedback of the type which would have any diagnostic value to the host(s) and/or presenter(s).

Therefore, there is a need for a method and apparatus for generating a contextual timeline for use in assessing the effectiveness of presenters or the materials used by the presenters.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for generating a contextual timeline for use in assessing the effectiveness of materials and/or presenter(s) is described. The method acquires context, from the perspective of at least one participant in the online interaction, along an online interaction timeline. The method provides, for display, a graphical representation of variations in at least one measure of participant interactivity along at least a portion of the online interaction timeline. The method further provides, for display, an image alignable with a point in time along the online interaction timeline, wherein the image provided for display is representative of content presented to participants at the point in time.

In another embodiment, an apparatus for generating a contextual timeline for use in assessing the effectiveness of materials and/or presenter(s) is described. The apparatus includes a computer having one or more processors and further comprises a context timeline generator comprising instructions executable by the one or more processors to acquire content presented, across a timeline, to at least one participant of a plurality of participants in the online interaction. The context timeline generator further comprises instructions executable to provide, for display, a graphical representation of variations in at least one measure of participant interactivity along at least a portion of the online interaction timeline. The context timeline generator further comprises instructions executable to provide, for display, an image alignable with a point in time along the online interaction timeline, wherein the image provided for display is representative of content presented to participants at the point in time.

In yet another embodiment, a computer readable medium for generating a contextual timeline for use in assessing the effectiveness of materials and/or presenter(s) is described. The computer readable medium stores computer instructions that, when executed by at least one processor causes the at least one processor to perform the method for generating a contextual timeline for use in assessing the effectiveness of materials and/or presenter(s).

While the method and apparatus method and apparatus for generating a contextual timeline is described herein by way of example for several embodiments and illustrative drawings, those skilled in the art will recognize that the method and apparatus for generating a contextual timeline is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for generating a contextual timeline defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus are disclosed for generating a contextual timeline of an online interaction such, for example as a "live" web conference, webinar, or other online meeting, or a pre-recorded video presentation. Provided for display to a user is a graphical representation of variations, over at least a portion of the timeline, in participant engagement, attentiveness, attendance and/or some other measure of participant interactivity. Also provided for display to the user are one or more images aligned with one or more corresponding points in time along the timeline. The images provided for display in alignment with the timeline are representative of content presented to the at least one participant at one or more points in time. According to some embodiments, the points in time are user selectable, and the one or more images are provided for display in alignment with the timeline in response to user selections.

When an online meeting host, organizer or other interested user desires to access a timeline of an online meeting augmented by contextual information, the host invokes a visual context timeline analyzer via a browser or locally executable application. Graphically depicted on the invoking users display is a chart plotted against an orthogonal coordinate system. In an embodiment, time is plotted along the horizontal axis, while attendance and/or engagement are plotted with respect to the vertical axis. Variations in attendance and/or engagement are visually presented to the user's computer display. To access context visually anywhere along the timeline, the host positions a pointer via mouse, touchscreen input or eye tracking. The pointer movement causes a server to provide, for display, a thumbnail image at any user-selected point along the graph. In some embodiments, as where a recording of the online meeting took place, audible context or its text equivalent are provided. In this way, the host can readily determine—at a glance— whether there is any discernible reason for a fall-off (or spike) in attendance or engagement.

Online meetings are typically organized by a host, and can be attended by a potentially large number of geographically dispersed participants. Though online meetings are often intended to be interactive, one or more presenters are often scheduled to present information to the participants in an organized fashion. During a presentation, the participants may listen to the presenter speaking at the same time as they are viewing a slide presentation or video on the display of their computer. The computer used by each participant, host and presenter may be a desktop, notebook, laptop, or tablet computer or even a smartphone or wearable computer. Web-based tools such as ADOBE® CONNECT™ currently present the host of an online meeting with an ability to track such measures of participant interactivity as attentiveness, engagement, and event attendance with respect to an online meeting timeline. The tracked measures support a rich set of reporting functions. After an online meeting, for example, the host may view a graphic plot showing fluctuations in an aggregate level of attentiveness or engagement or in the number of participants at pre-defined time intervals, for example minute-by-minute intervals, across an entire timeline. As used herein, an online meeting (or interaction) timeline refers to the time period extending from the start time to the end time of an online meeting, or any portion thereof that is of interest to the host, presenter, or presented content author.

One problem with current solutions is that the graphical depiction of time varying measures in participant interactivity, as described above, provides no context as to the state of online meeting from the perspective of the participants. By way of example, a host may be presented with a simple report graphically depicting the number of participants, from one minute to the next, over an entire online meeting timeline. Viewing such a report, the host may take note of a noticeable drop in the number of participants at a point thirty minutes from the start of the meeting. Without such context as the identity of the presenter at this point in time, or the material(s) being visually displayed to the participants at their respective terminals, the options of the host are somewhat limited. With access to a recorded version of the online meeting or video, the host might retrieve and replay the meeting to identify the applicable portion. Otherwise, the host would need to rely on notes, an estimate, or simply forego deeper investigation.

According to embodiments, the aforementioned issue is addressed by providing a quick view thumbnail image visually depicting the context of the online meeting, from the perspective of one or more participants. The thumbnail image of the visual context is provided for display to the host's computer, in some embodiments, responsive to hovering of a pointer at a user-selected position along the timeline or along the graphical plot itself. In embodiments where an audio track for the online meeting has been recorded and is accessible, a live feed of the audio is also reproduced at the host's computer and synchronized to begin at the user-selected position. Continuing the foregoing example, a host looking at the applicable online meeting timeline can quickly identify a transition between presenters, or even a particular slide or set of slides, as a trigger for participant attrition. Conversely, a sudden and sustained spike in the number of participants might signal to the host that a particular presenter is especially popular.

Various embodiments of a method and apparatus for generating a contextual timeline of an online interaction are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
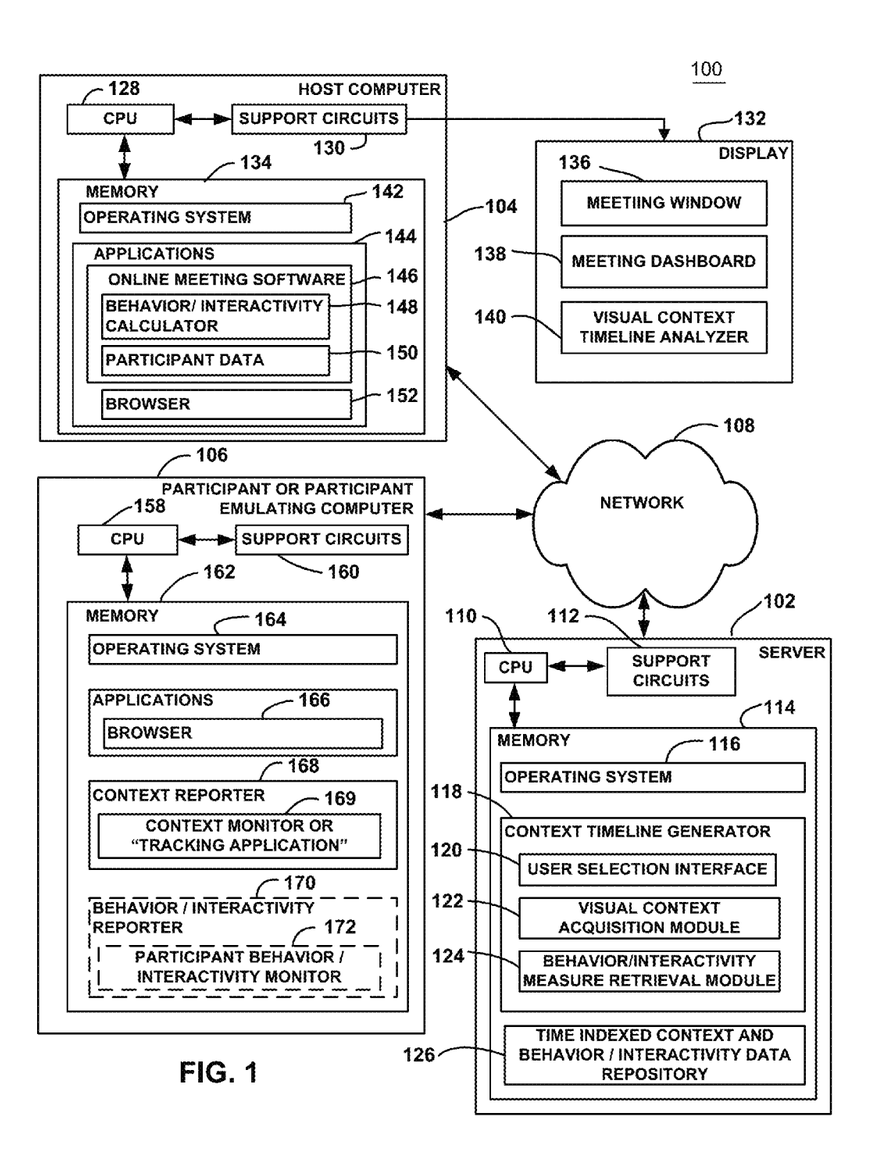
FIG. 1 is a block diagram of a system for generating a contextual timeline for use in assessing the effectiveness of materials and/or presenter(s), according to one or more embodiments.

FIG. 1 is a block diagram of a system 100 for generating a contextual timeline of an online interaction, according to one or more embodiments. The system 100 comprises a server 102, a host computer 104, and at least one participant computer 106. The server 102, host computer 104 and participant computer(s) 106 are connected via a network 108.

The network 108 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like. In some embodiments, the network 108 includes one or more networks including but not limited to Local Area Networks (LANs) (e.g., an Ethernet or corporate network), Wide Area Networks (WANs) (e.g., the Internet), wireless data networks, some other electronic data network, or some combination thereof.

The server 102 is a computing device, for example a desktop computer, laptop, tablet computer, and the like or the server 102 may be a cloud based server e.g., a blade server, virtual machine, and the like. The server 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system 116, and a context timeline generator 118 that includes a user selection interface 120, a visual context acquisition module 122, and an interactivity measure retrieval module 124. Memory 114 also includes a repository 126 of time stamped meeting context and participant interaction data (e.g., data indicative of participant engagement or interest, or lack thereof), acquired over the entire timeline of a plurality of online meetings. The operating system 116 may include various commercially known operating systems.

The host computer 104 is a type of computing device (e.g., a laptop, a desktop, a Personal Digital Assistant (PDA) and/or the like). The host computer 104 comprises a CPU 128, support circuits 130, a display 132, and a memory 134. The CPU 128 may comprise one or more commercially available microprocessors or microcontrollers that facilitate data processing and storage. The various support circuits 130 facilitate the operation of the CPU 128 and include one or more clock circuits, for example a meeting timer, power supplies, cache, input/output circuits, displays, and the like. The display 132 comprises a meeting window 136, a meeting dashboard 138, and a visual context timeline analyzer 140. The memory 134 comprises at least one of Read Only Memory (ROM), Random Access Memory (RAM), disk drive storage, optical storage, removable storage and/or the like. The memory 134 comprises an operating system 142 and a plurality of application such as online meeting software 146, which includes a participant interactivity (e.g., interactivity) calculator 148 and participant data 150, and a web browser 152. Although in the illustrative embodiment of FIG. 1 the online meeting software 146 is depicted as being resident in the memory 134 of host computer 104, it will be readily appreciated by those skilled in the art that such software, and its attendant modules 148 and 150, may alternatively be hosted at server 102 in the same manner as context timeline generator 116. Likewise, the context timeline generator 118 and accompanying repository shown as being resident in the memory 114 of server 102 may be consolidated at host computer 104, such that host computer 102 may be omitted in its entirety.

In any event, and with continuing reference to the illustrative embodiment of FIG. 1, the operating system 142 of host computer 104 generally manages various computer resources (e.g., network resources, file processors, and/or the like). The operating system 142 is configured to execute operations on one or more hardware and/or software modules, such as Network Interface Cards (NICs), hard disks, virtualization layers, firewalls and/or the like. Examples of the operating system 120 may include, but are not limited to, Linux, Mac OSX, BSD, UNIX, Microsoft Windows, and the like. The online meeting software 122 may be any online meeting software such as ADOBE@ CONNECT™ available from ADOBE Systems Incorporated, San Jose, Calif., capable of connecting participants over a network.

The participant computer 106 is a type of computing device (e.g., a laptop, a desktop, a Personal Digital Assistant (FDA) and/or the like). The participant computer 106 comprises a CPU 158, support circuits 160, and a memory 162. The CPU 158 may comprise one or more commercially available microprocessors or microcontrollers that facilitate data processing and storage. The various support circuits 160 facilitate the operation of the CPU 158 and include one or more clock circuits, for example a meeting timer, power supplies, cache, input/output circuits, displays, and the like. The memory 162 comprises at least one of Read Only Memory (ROM), Random Access Memory (RAM), disk drive storage, optical storage, removable storage and/or the like. The memory 162 comprises an operating system 164, and a browser 166, as well as a context reporting module 168 which includes a context monitor 169. Optionally, memory 162 further comprises a participant interaction reporting module 170 which includes a participant interaction monitor 172.

In FIG. 1, participant computer 106 is referred to as a "participant or participant emulating computer". Such a designation refers to the fact that in some embodiments, the computer 106 is actually a computer used by one of the participants invited to an online meeting hosted by host computer 104. In other embodiments, however, host computer 104 simply invites a "hidden" participant in the form of a computer set up for the limited purpose of acquiring visual context snapshots, from the perspective of the participant in an online meeting, across the online meeting timeline. In the case of an emulated participant, obviously, there is no actual interactivity data to be acquired and forwarded to server 102. Indeed, it should be noted that in other embodiments, where a recording of the entire online presentation has been arranged, the required snapshots may be acquired after the fact through image analysis and extraction techniques. Each of these alternatives are described in greater detail later, in connection with FIGS. 4A-4C, respectively. At this point, it suffices to say that the generation and display of a contextual timeline in accordance with one or more embodiments presumes the availability of participant interaction measures from one or more sources.

By way of example, a technique for collecting data for and calculating such measures is described in U.S. Patent Application Publication US 2013/0339875 by Sahai et al, which was published on Dec. 19, 2013, is assigned to Adobe Systems Incorporated of San Jose, Calif., and is entitled "METHOD AND APPARATUS FOR PRESENTING A PARTICIPANT ENGAGEMENT LEVEL IN ONLINE INTERACTION". In that publication, there is described a participant "activity monitor" which acquires attentiveness data and derives an attentiveness "score" using an activity points table, a delay calculator. The activity points table described therein is a text file comprising entries mapping different participant meeting activities to activity points, and an indicator regarding whether the activity points are subject to decay. While an online meeting is in progress, the activity monitor continually monitors the participant's interactions with the online meeting. An attentiveness calculator calculates activity points based on the participant's interactions detected by the activity monitor.

For example, when a participant joins an online meeting using his or her browser, the activity monitor described in the aforementioned publication detects the meeting window of the browser has focus, meaning the meeting window is active. The attentiveness calculator accesses the activity points table, which contains an entry associated with "browser in focus" and an associated activity point value. The attentiveness calculator stores the current activity point value in the attentiveness data. Failure to respond to a poll at a point along the meeting timeline is presumed to indicate a lack of attentiveness on the part of the participant. Such a failure results in a downward adjustment in the activity point value stored in the attentiveness data. The attentiveness calculator also stores the highest earned activity points for the current period, for example, the current one-minute cycle, in the attentiveness data. If the activity monitor determines the online meeting window in the browser has been minimized, the attentiveness calculator accesses the activity points table to find that this gives the participant a score of, for example, 20 activity points. When the total activity point value is stored, the highest earned activity points for the current one-minute cycle is updated if the activity point value is higher than the highest earned activity points.

The aforementioned publication further describes techniques for deriving, at a host computer as host computer 104, a measure of engagement. According to some embodiments described therein, at one minute intervals, a maximum activity point value calculated by the attentiveness calculator at the participant computer during the previous one minute interval on each participant computer is sent to the host computer. In some embodiments, all attentiveness data is sent to the host computer. An engagement calculator on the host computer collates the data of each participant and averages the participant attentiveness scores to determine a meeting engagement index along the entire meeting. The attentiveness data, collated data, and calculated results are stored as participant data on the host computer.

According to some embodiments herein, interactivity calculator 148 of host computer 104 collates data received from participants as described above, averages the participants' attentiveness scores, and derives an engagement index. The aforementioned attentiveness data and calculated results are stored as participant data 150. The participant data 150 may include participant attentiveness scores, individual participant polling results, question and answer result summaries. Various metrics derived from the participant data along with the meeting engagement index are displayed on the meeting dashboard 138 on the display 132 of the host computer 104. The meeting engagement index and other objective indicia of participant attentiveness and/or is engagement are recalculated by the interactivity calculator 148 at regular intervals (e.g., every minute) when the attentiveness data is received at the host computer 104 from each of the one or more participants.

The online meeting software 146, for example, ADOBE® CONNECT™, runs inside the browser 166 and also runs within an add-in (not shown) based on ADOBE® Flash Player. Via the browser 166 using JavaScript, the add-in, and Flash Player, the interaction monitor 146 is able to determine a participant's attentiveness (i.e., the participant's interaction with the online interaction). For example, the activity monitor 146 is able to identify a state of a window, such as in focus, minimized, maximized, or full-screen. The online meeting software 146 can determine when a poll is active and open for polling. The online meeting software 146 also can determine if a participant has voted in the poll or not. Using this information in combination, the interactivity monitor 172 can determine when a poll is currently open but the participant has not voted.

It should be emphasized, before proceeding, that other measurements of indicia and engagement are contemplated by the inventors herein and that the aforementioned non-limiting example is intended to be by way of illustration only. A less sophisticated indicia of participant interest tracked by interaction calculator 148 is a simple headcount, with respect to time, of the number of online meeting participants present. This number may grow, to the extent participants join or return to the meeting, or it may shrink, to the extent participants leave the meeting after it is started, but any fluctuations therein can provide valuable insights into the effectiveness of a presenter or a presenter's materials, as previously described.

According to embodiments, a selected one of the plurality of participant computers, such as participant computer 106, includes a context reporter module 168 which includes a context monitor 169. At regular intervals, the context monitor 169 acquires a "snapshot" of the context being presented to the display (not shown) of the participant computer 106. Typically, each snapshot include a single image as displayed by the participant computer 106 at a particular moment in time or over an interval spanning anywhere on the order from several seconds to ten minutes or more. If multiple images are presented by the online meeting software 146 at the same time for display to the participant computer 106, these may either be combined by context monitor 169 into a single composite image or a separate snapshot may be acquired for each image. According to some embodiments, the snapshot images acquired by context monitor 169 over successive intervals, for example one minute intervals are sent to server 102 as they are acquired. In other embodiments, the snapshot images are stored and transmitted to the server 102 at the conclusion of the online meeting or thereafter.

In addition to or instead of capturing snapshots of the visual component as presented to the user of participant computer 106 in an online meeting, at a given instant in time or during a snapshot "window" spanning tens of seconds to several minutes or more, an excerpt of the presenter's speech may be acquired by context monitor 169. In some embodiments, context monitor 169 supports speech recognition and/or speech-to-text capability. In some speech recognition embodiments, context monitor 169 is configured during successive monitoring intervals, for example one minute monitoring intervals to extract and time stamp an excerpt of the audio component of a presentation and to synchronize it with a snapshot of material being visually presented by the presenter, via a correlating time stamp. Alternatively, the context monitor 169 employs speaker recognition to make an identification of the presenter. The identity of the speaker can either be visually displayed by itself, together with a snapshot of visual content as above described, and/or together with a transcript of the presenter's speech applicable to a capture window.

When the host desires to access a timeline of an online meeting augmented by contextual information using system 100, the host invokes the visual context timeline analyzer 140 via the browser 146 of host computer 104. Graphically depicted on display 132 is a chart plotted against an orthogonal coordinate system. In an embodiment, time is plotted along the horizontal axis, while attendance and/or engagement are plotted with respect to the vertical axis. Variations in attendance and/or engagement are thus visually presented to the host via display 132. To access context visually anywhere along the timeline, the host positions a pointer via mouse, touchscreen input or eye tracking (in the case of wearable computer embodiments, for example). Such pointer movement causes server 102 to provide, for display, a thumbnail image at the user-selected point along the plotted graph. In some embodiments, as where a recording of the online meeting took place, audible context or its text equivalent are provided. In this way, the host can readily determine—at a glance—whether there is any discernible reason for a fall-off (or spike) in attendance or engagement.

Figure 2:
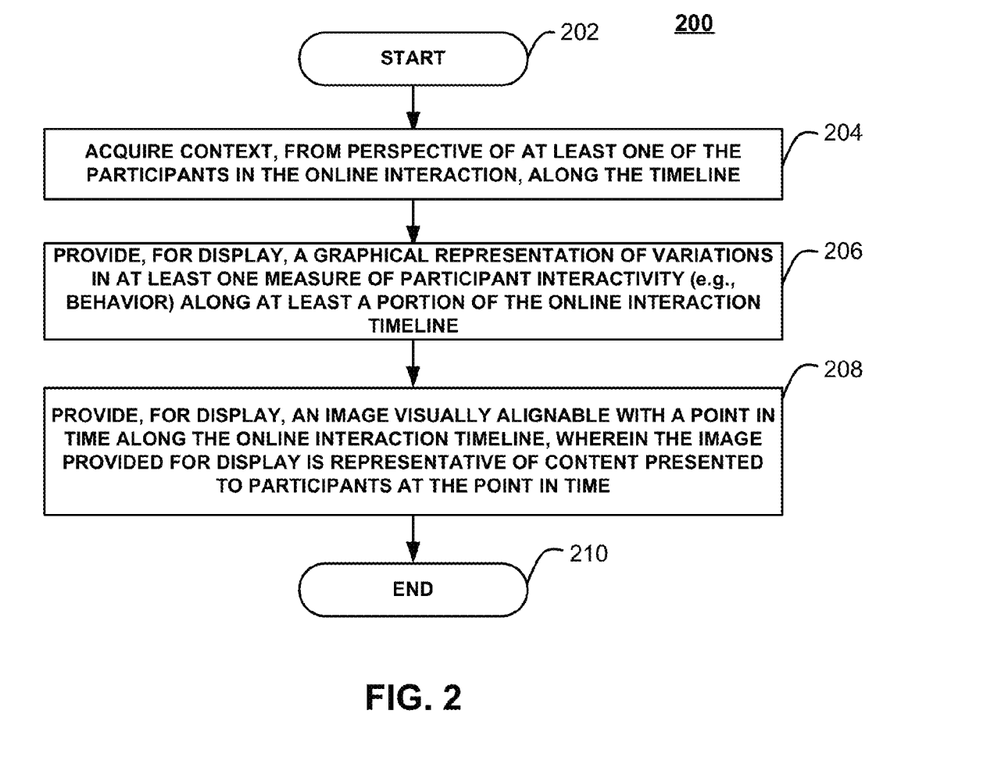
FIG. 2 is a flow diagram depicting a method for generating a contextual timeline for use in assessing the effectiveness of materials and/or presenter(s) as performed by the contextual timeline generator of FIG. 1, according to one or more embodiments.

FIG. 2 depicts a flow diagram depicting a method for generating a contextual timeline for use in assessing the effectiveness of materials and/or presenter(s) as performed by the contextual timeline generator 118 of FIG. 1, according to one or more embodiments. The method 200 generates and provides a timeline of participant attendance and/or engagement augmented by visual context references. The method 200 starts at step 202 and proceeds to step 204.

At step 204, the method 200 acquires context, from the perspective of at least one of the participants in an online interaction (e.g., meeting), along a timeline which extends somewhere between the starting point of the online interaction and its ending point (e.g., along the timeline of the entire interaction). The timeline may encompass one, both or neither of these terminal points (i.e., in accordance with user-defined limits). For example, a user may be interested only in a timeline associated with a particular presenter, or respective timelines associated with corresponding presenters, and may pre-define appropriate terminal points over the course of an online interaction.

The method 200 proceeds to step 206, where the method 200 provides for display to a user, a graphical representation of variations in at least one measure of participant interactivity (e.g., engagement in the online interaction) along at least a portion of the online interaction timeline, as described in further detail with respect to FIGS. 3 and 4D below.

The method 200 proceeds to step 208, where the method 200 provides one or more images visually alignable with point(s) in time along the online interaction timeline, for display to the viewer. According to some embodiments, each image is representative of content presented to the online interaction participants at a user-selected point in time. The method 200 proceeds to step 210 and ends.

Figure 3:
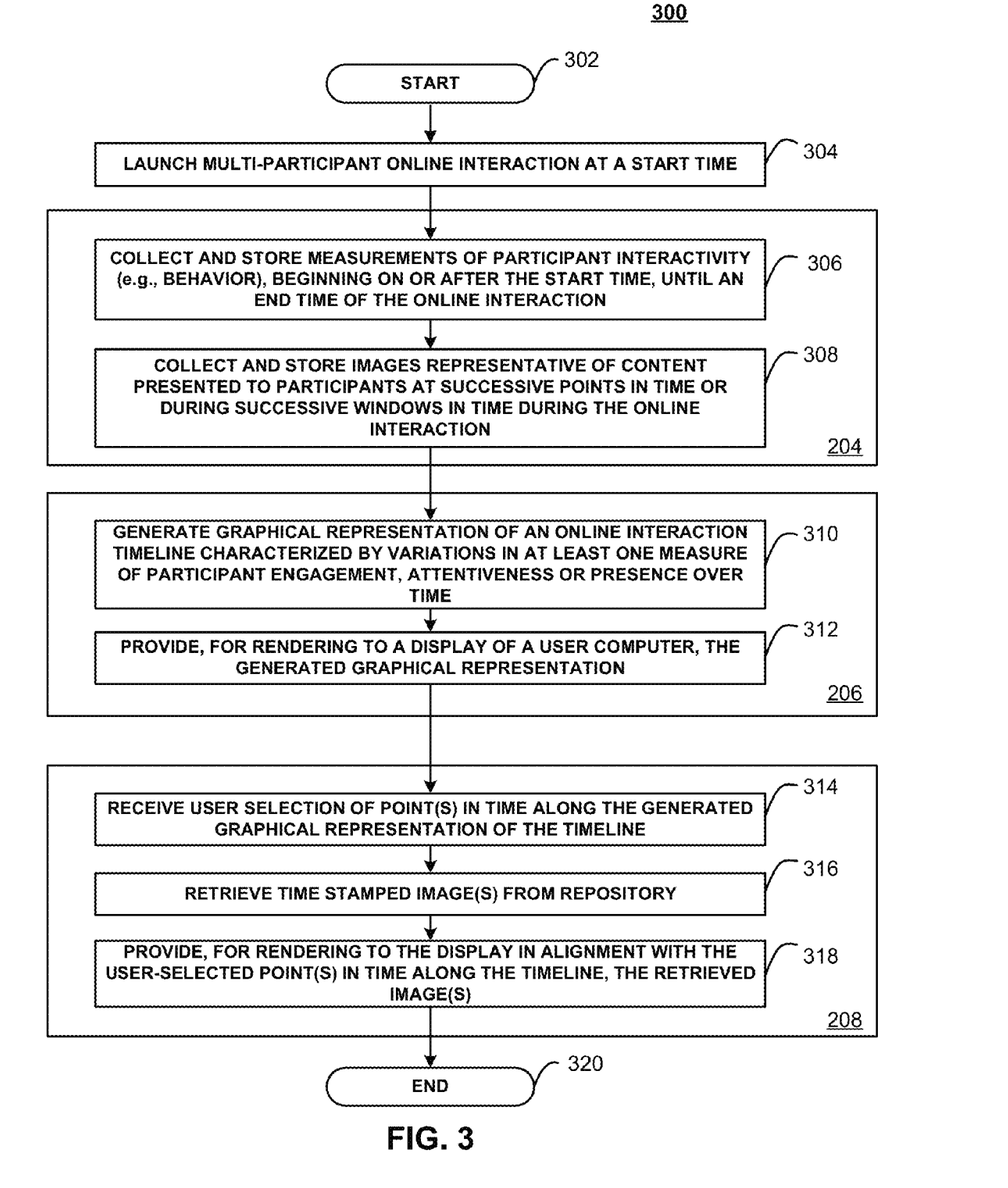
FIG. 3 is a flow diagram depicting further details of a method for generating a contextual timeline for use in assessing the effectiveness of materials and/or presenter(s) as performed by the contextual timeline generator of FIG. 1, according to one or more embodiments.

FIG. 3 depicts a flow diagram of further details of a method 300 for generating a contextual timeline for use in assessing the effectiveness of materials and/or presenter(s) as performed using the contextual timeline generator 118 of FIG. 1, according to one or more embodiments. The method 300 collects and stores time varying measures of participant interactivity across an online interaction timeline, along with snapshots of the visual context experienced by the user over the same time timeline. The method 300 starts at step 302 and proceeds to step 304.

At step 304, the method 300 launches a multi-participant online interaction, at a start time, from a host computer. The method proceeds to step 306, where the method 300 begins collecting and storing measurements (or "measures") of participant interactivity. Participant interactivity may be merely an instantaneous number of participants at a given moment in time, or an average number of participants over a measurement interval of, for example, one minute. In some embodiments, the measurements of participant interactivity collected by method 300 at step 306 include measures of attentiveness, from which a time varying engagement index can be derived. In some embodiments, a default measurement of attentiveness is assigned to a participant according based on events defined in a table. For example, an open meeting window "maximized" on a participant's display corresponds to a default value of "70", while a minimized window corresponds to a default value of "20" according to the table. In some embodiments, an image of the participants' faces and, in particular, the movements of the participants eyes and/or facial expressions are captured by a camera at regular intervals. Through image analysis values of attentiveness can be derived. If the participant is actively viewing the screen, for example, a high value of attentiveness is assigned. Conversely, if the participant is diverting his or her attention to something else in the environment other than the screen, a lower value is assigned.

The method proceeds to step 308, where it collects and stores images representative of content presented to participants at successive points in time or across successive measurement intervals ("windows") corresponding, in some embodiments, with the same measurement intervals as used for the collection of measurements at step 306.

From step 308, the method 300 advances to step 310. At step 310, the method generates a graphical representation of an online interaction timeline characterized by variations in at least one measure participant engagement, attentiveness, or presence over time. Attentiveness measures collected at step 306, for example, can be aggregated and used to calculate an average "engagement score" plotted with respect to time to provide an "index". However, in alternative embodiments, the attentiveness scores for multiple individuals are plotted separately with respect to time. In still other embodiments, subsets of the attentiveness scores are aggregated and plotted with respect to time so as to representing distinct socio demographic groups of interest to the user. The resulting graphs are provided, at step 312, to an inquiring user for local display and further analysis.

The method 300 proceeds to step 314, where the method 300 receives user selections of one or more specific points along the graphical representation of the participant interactivity. In some embodiments, the points are identified by the user hovering a pointer along the chart, while in other embodiments, the user clicks on selected points and then on a "send" button.

Responsive to the user selection(s), the method 300 proceeds to step 316 and retrieves time stamped images from a repository. In some embodiments, a thumbnail version of the retrieved image is generated as part of the retrieval process and in other embodiments the images are stored in a thumbnail form. At step 318, the method 300 provides the retrieved images in real time as the pointer is moved along the graphed relationship. Alternatively, the method 300 sends the user, at step 318, a single page containing all selected thumbnail images. The images are aligned with specific intervals along the timeline of the online interaction, as noted previously. The method 300 proceeds to step 320 and ends.

Figure 4A:
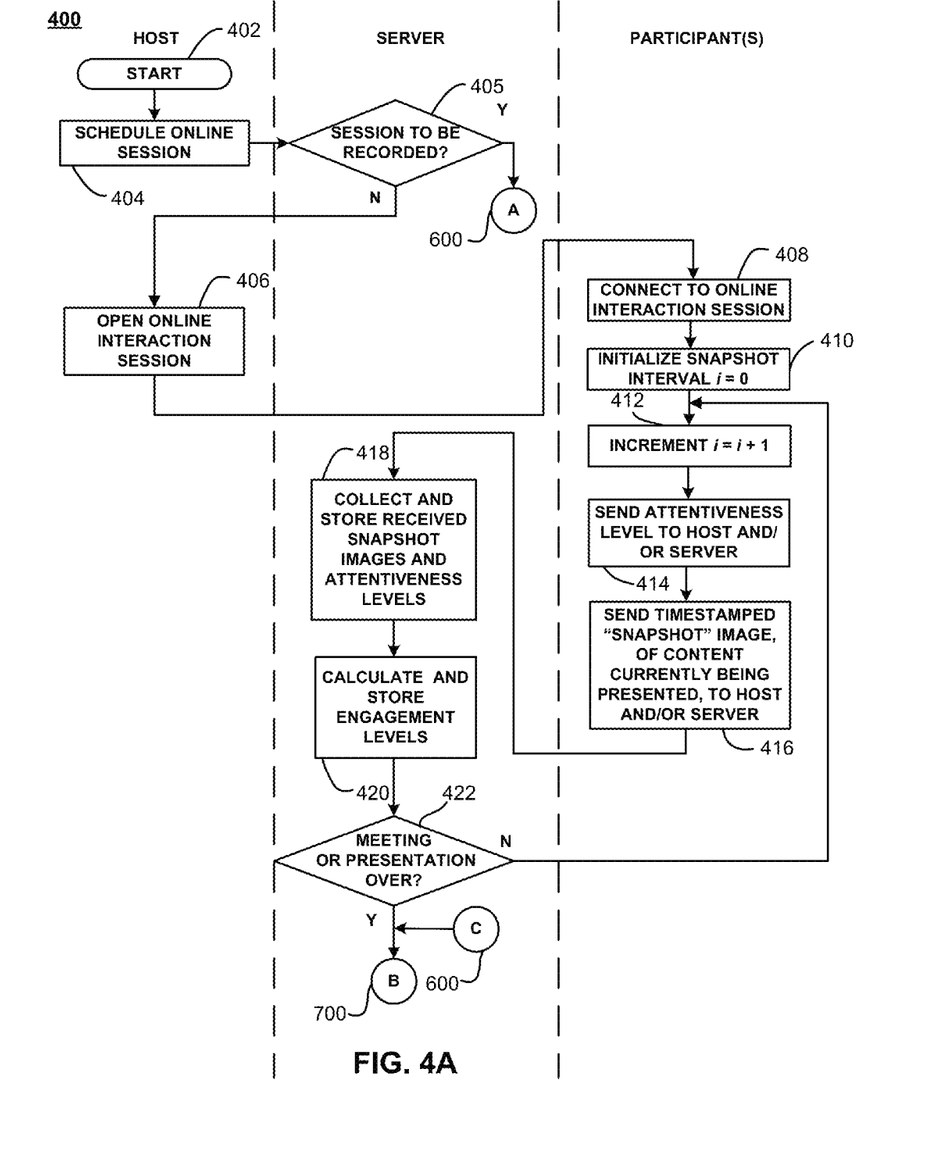
FIG. 4A is a flow diagram depicting steps associated with the extraction of images and the collection of measures of participant interactivity, for use in generating a contextual timeline, according to an embodiments.

FIG. 4A is a flow diagram depicting steps of a method 400 associated with the extraction of images and the collection of measures of participant interactivity, for use in generating a contextual timeline, according to some embodiments. The method 400 is entered at step 402 and proceeds to step 404. At step 404, a host or organizer schedules a hosted online meeting or other online interaction (referred to as an "online session" in step 404 of FIG. 4A). The method 400 proceeds to determination step 405.

At determination step 405, method 400 determines whether or not the host has arranged for the online session to be recorded. If the method 400 determines the host has arranged for the online session to be recorded, the method 400 enters method 600, at point A, to be described later in connection with FIG. 4C. However, if at step 405, the method 400 determines the host has not arranged for the online session to be recorded, the method 400 proceeds to step 406. At step 406, the host opens the online interaction/session at which time real time, online interaction sessions are initiated with a plurality of geographically distributed participants. At step 408, the method establishes a monitoring session, with a selected one of the plurality of participants, at the same time it connects the selected participant to the online interaction/session. According to some embodiments, the participant's computer launches a context monitor, also referred to herein as a context tracking application.

The purpose of the context tracking application is to extract and send snapshots, which can be full size "screenshots" of any image shown in the online meeting window display, at various times and/or intervals along the online interaction timeline. In some embodiments, the tracking application is also configured to extract a thumbnail equivalent of each snapshot.

The method 400 proceeds to step 410. At step 410, the method initiates a snapshot interval counter i, setting the value of the counter i to zero. From step 410, the method proceeds to step 412, where the snapshot interval value is incremented by 1. According to some embodiments, the interval is equal to n minutes, where n is an integer having a value equal to or greater than 1. In the illustrative embodiment of FIG. 4A, the snapshot interval is selected so as to match the time interval used by the participant computers to calculate and report attentiveness scores as previously described. As will be readily appreciated by those skilled in the art, however, it is not necessary for the respective intervals to match, so long as they can be correlated later through analysis. Indeed, in some embodiments snapshots are not even taken at regular intervals. For example, for maximum saving of bandwidth, method 400 takes a snapshot only when the image in the meeting window changes (e.g., when a meeting presenter changes from one slide to the next slide of a slide presentation). These "transition" snapshots are time stamped, either with a time of collection or with a window over which the corresponding image appeared in the meeting window on the participants' displays. By appropriate time or window stamping, the correlation between any particular image and a point along the online interaction timeline is readily and automatically performed.

In any event, and with continued reference to the embodiment of FIG. 4A, the method 400 advances from step 412 to step 414. At step 414, an attentiveness score is sent by the participant hosting the context tracking application to the host and, in some embodiments, the server. The method 400 advances to step 416, where a time stamped snapshot image of content visually presented to the participants via the online meeting window is likewise sent to the host and/or server. In the embodiment of FIG. 4A, both the attentiveness scores and the snapshot images are collected and stored, at a server repository, at step 418. From the attentiveness scores, an engagement level index score representing an aggregation of the attentiveness scores from many users is calculated at step 420. Also stored at the server repository is an indication, at each snapshot, of the instantaneous number of participants still participating in the online interaction. Alternatively, where the indication applies to a window spanning a minute or more, an average attendance over the interval is stored. The method 400 proceeds to step 422, where a determination is made as to whether the meeting has ended. If the meeting has not ended, the method 400 returns to step 412, where the snapshot interval counter is incremented by one and another iteration of steps 414-420 is performed. If at step 422, it is determined that the meeting has ended, the method 400 is resumed, as method 700 depicted in FIG. 4D, once a host, presenter or other interested party wishes to access a contextual timeline report generated according to one or more embodiments.

Figure 4B:
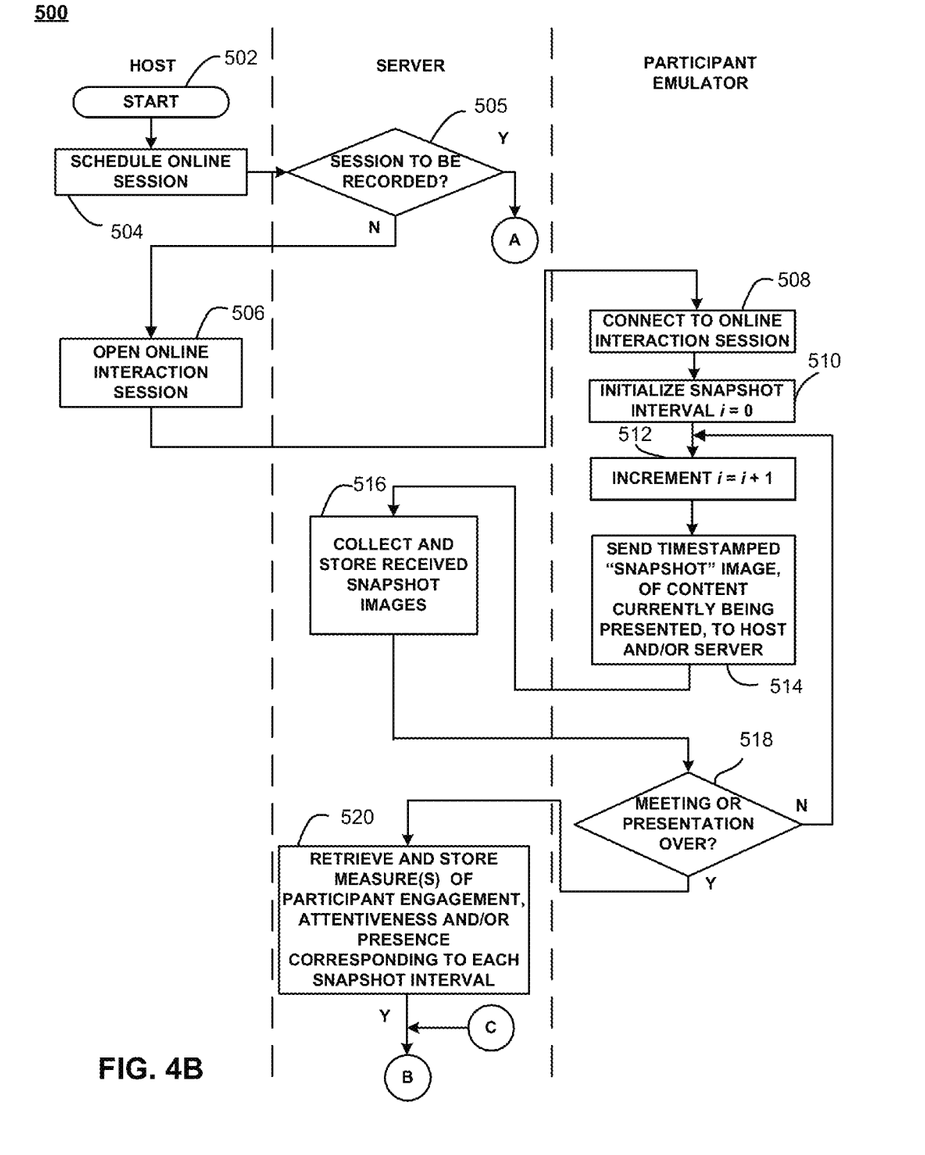
FIG. 4B is a flow diagram depicting steps associated with the extraction of images and the retrieval of measures of participant interactivity, for use in generating a contextual timeline, according to an alternate embodiment.

FIG. 4B is a flow diagram depicting the steps of a method 500 associated with the extraction of images and the retrieval of measures of participant interactivity for use in generating a contextual timeline, according to alternate embodiments. The embodiment of FIG. 4B differs from the embodiment of FIG. 4A in that the extraction and reporting of image snapshots at regular intervals is performed by the computer of a "participant emulator" rather than that of an invited participant. In this case, there are no "participant interactivity" measurements to collect and report to the host and/or server. The method 500 is entered at step 502 and proceeds to step 504. At step 504, a host or organizer schedules a hosted online meeting or other online interaction (referred to as an "online session" in step 504 of FIG. 4A). The method 500 proceeds to determination step 505.

At determination step 505, method 500 determines whether or not the host has arranged for the online session to be recorded. If so, the method 500 enters method 600, at point A, to be described later in connection with FIG. 4C. If the host has not arranged for the online session to be recorded, the method 500 proceeds to step 506. At step 506, the host opens the online interaction/session at which point real time, online interaction sessions are initiated with a plurality of geographically distributed participants. At step 508, the method 500 initiates the collection of contextual snapshots by connecting a participant emulating computer to the online interaction session. The participant emulating computer launches the previously described context tracking application.

The method 500 proceeds to step 510. At step 510, the method 500 initiates a snapshot interval counter i, setting the value of the counter i to zero. From step 510, the method proceeds to step 512, where the snapshot interval value is incremented by 1. According to some embodiments, each interval is equal to n minutes, where n is an integer having a value equal to or greater to 1. In the illustrative embodiment of FIG. 4B, the snapshot interval is selected so as to match the time interval used by the participant computers connected to the online interaction session.

The method 500 advances from step 512 to step 514. At step 514, a time stamped snapshot image of content visually presented to the participants via the online meeting window is sent to the host and/or server. In the embodiment of FIG. 4B, the snapshot images are collected and stored, at a server repository, at step 516. The method 500 proceeds to step 518, where a determination is made as to whether the meeting has ended. If not, the method 500 returns to step 512, where the snapshot interval counter is incremented by one and another iteration of steps 514-518 is performed. Otherwise, the method 500 proceeds to step 520 and retrieves and stores measurements of such interactivity measures participant engagement, attentiveness, and/or attendance as exemplified by techniques such as those already described above. In some embodiments, the aforementioned interaction data is collected and stored by the host and step 520 is omitted. In such embodiments, the alignment of images with timelines of plotted interactivity measures can be performed at the host computer, wherein the server is responsible only for supplying the snapshot images (or thumbnails thereof) to the host. In still other embodiments, the functions of the server and host depicted in FIG. 4A or 4B are consolidated in one computer or server. The process 500 is resumed, as method 700 depicted in FIG. 4D, once a host, presenter or other interested party wishes to access a contextual timeline report generated according to one or more embodiments.

Figure 4C:
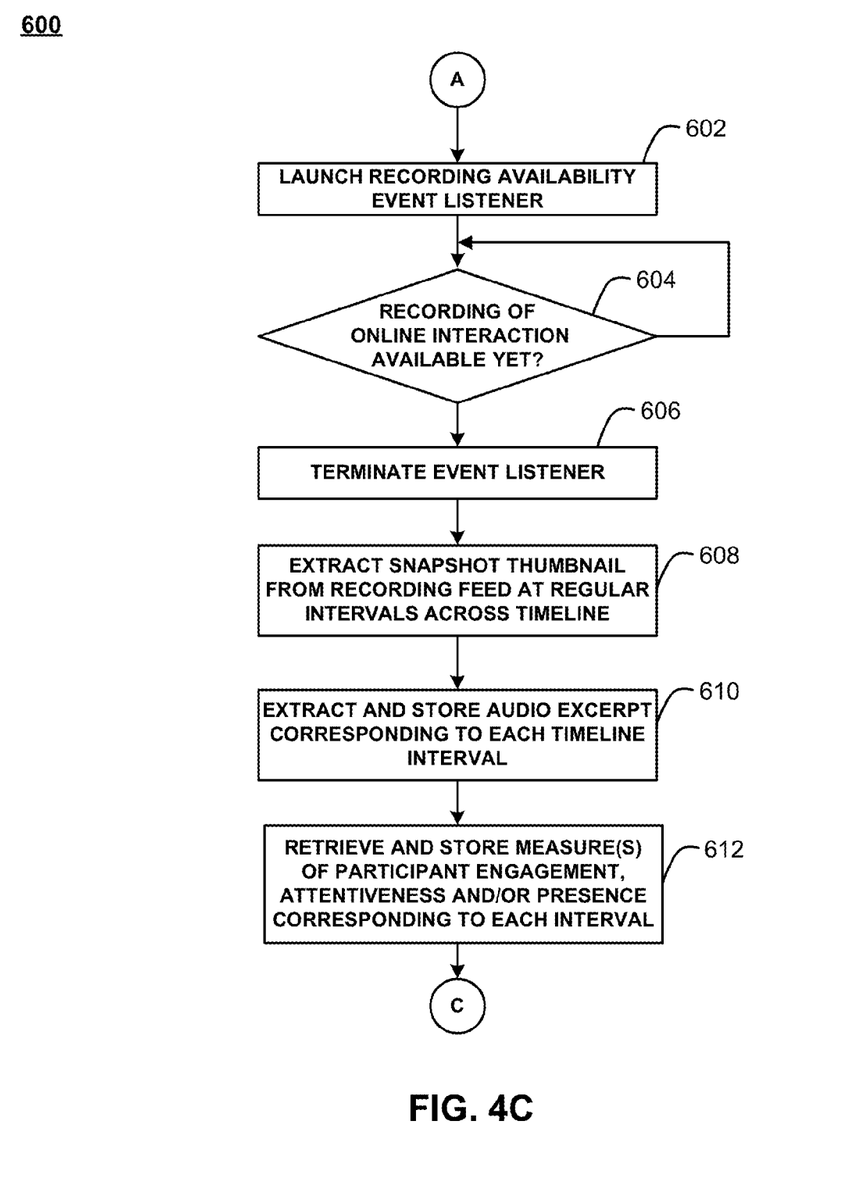
FIG. 4C is a continuation of the flow diagrams of FIGS. 4A and 4B, depicting steps associated with the extraction of images from a recorded online interaction, in accordance with some embodiments.

FIG. 4C is a continuation of the flow diagrams of FIGS. 4A and 4B, depicting steps of a method 600 associated with the extraction of images from a recorded online interaction, in accordance with some embodiments. The embodiment of FIG. 4C depicts an extension of either of the two embodiments depicted in FIGS. 4A and 4B. Specifically, the embodiment of FIG. 4C accommodates the extraction of snapshot images from previously recorded online interactions. The method 600 transitions from method 400 or 500 at point A and proceeds to step 602, with the launch of an event listener able to detect the availability of recorder availability. At determination block 604, continues to await confirmation from the event listener, once a determination is made that the recording functionality is actively recording the online interaction session, the method 600 advances to step 606, where the event listener is terminated. The method 600 then proceeds to step 608. At step 608, the method extracts thumbnails and full size snapshots across the timeline of the recorded online interaction. At step 610, audio excerpts are also stored in association with the extracted images. In some embodiments, speech recognition is performed to identify the speaker and, optionally speech-to-text is also performed in order to visually present a portion of the excerpt. The intervals over which the images and, if applicable, audio excerpts are extracted are selected, in accordance with some embodiments, to match the availability and frequency of interactivity measurements. The latter measurements are retrieved and stored at step 612. The method 600 re-enters method 400 or 500 at point C, as shown in FIGS. 4A and 4B, respectively.

Figure 4D:
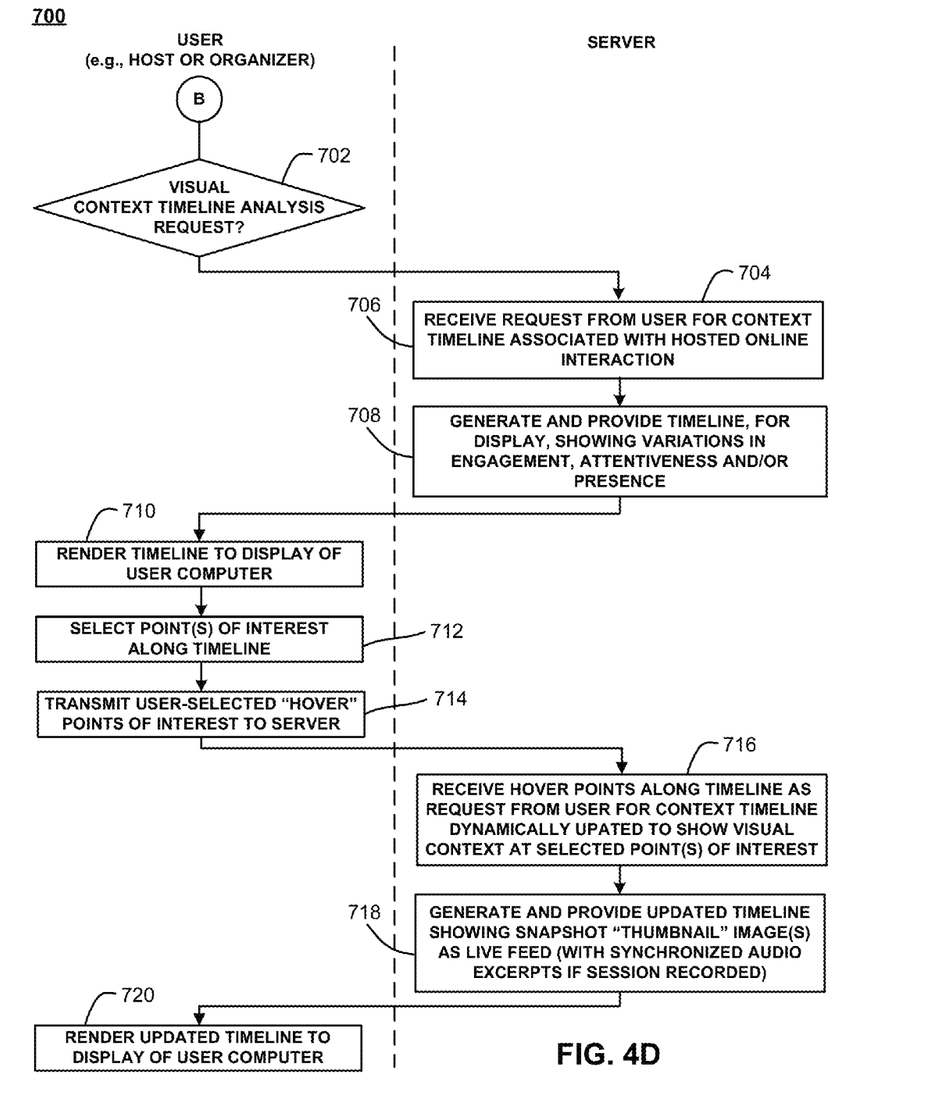
FIG. 4D is a continuation of the flow diagrams of FIGS. 4A and 4B, depicting steps associated with the generation of an online interaction timeline, having thumbnail images at user selected points therealong, according to some embodiments.

FIG. 4D is a continuation of the flow diagrams of FIGS. 4A and 4B, depicting steps of a method 700 associated with the generation of an online interaction timeline, having thumbnail images at user selected points therealong, according to some embodiments. Either of methods 400 and 500 is resumed at point B, at which point a determination is made at step 702 that a host, presenter or other interested party has initiated a request to generate a visual context timeline for analysis according to embodiments. If not, the method 700 (and thus, methods 400 and 500) terminates. Otherwise, the method 700 advances to step 704.

At step 704, the method 700 receives a request from a user for a context timeline associated with a hosted online interaction. The user is typically the host, but may also be a presenter, several presenters, or some other interested and authorized party. The method 700 proceeds to step 706, where method 700 generates and provides a timeline, for display, showing variations in aggregate and/or individual measures of engagement, attentiveness, and/or participant presence with respect to timeline.

Figure 5A:
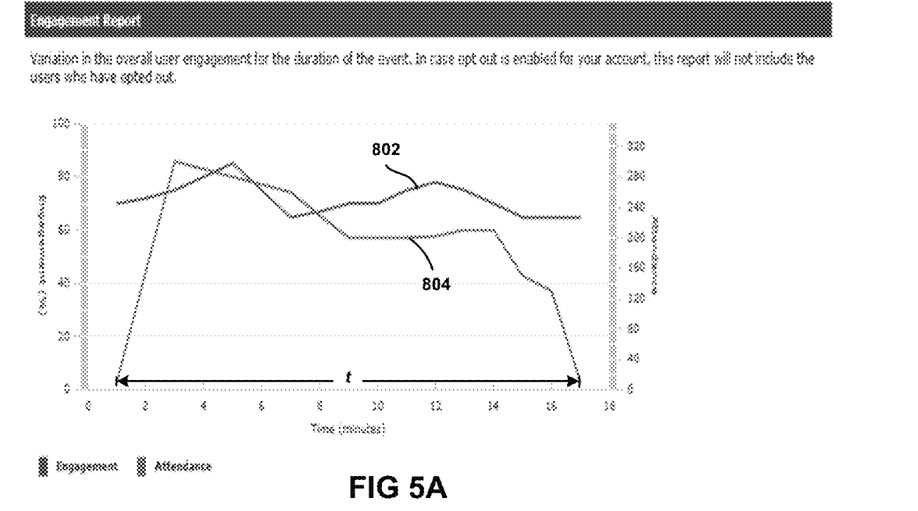
FIG. 5A illustrates an online interaction timeline, according to one or more embodiments.

Turning briefly to FIG. 5A, there is shown an exemplary online interaction timeline, according to one or more embodiments, with a first timeline 802 showing an aggregate measure of engagement and a second timeline 804 showing an average number of participants, each as reported through data collected at one minute intervals.

Figure 5B:
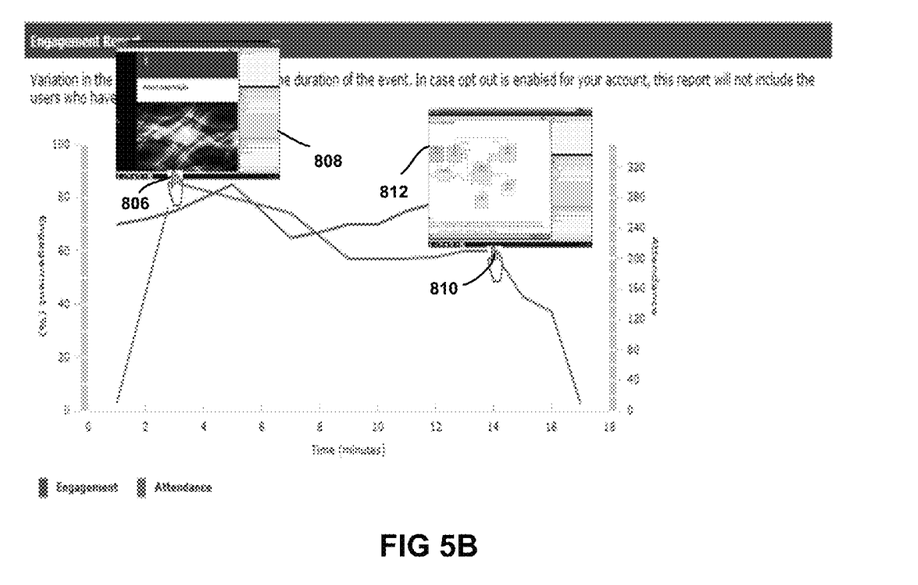
FIG. 5B illustrates how images are aligned with user selected points along the online interaction timeline of FIG. 5A, according to one or more embodiments.

The user's computer renders the provided timeline to its display at step 710, and at step 712, the user selects one or more points of interest as by hovering a pointer along any desired point of a graph. Turning briefly to FIG. 5B, there are shown two discrete user selected points of interest. User selected point of interest 806 is a point along timeline 804 indicating that attendance of the hosted online interaction was at its maximum. Likewise, user selected point of interest 810 also lies along the attendance timeline 804, but shows an inflection point at which point attendance began to drop precipitously well before the end point.

According to embodiments, and with simultaneous reference to both FIGS. 4D and 5B, hovering at points 804 and 806 result in method 700 results, at step 714, in the method 700 transmitting points 804 and 806 as points of interest. At step 716, the server receives the identification of these points and either updates and resends the timeline so as to include image thumbnails 808 and 812 or merely sends the images with timestamps for updating by the user's computer in accordance with locally executed instructions. In either case, at step 718, the timeline displayed at the user computer is updated to reflect the alignment of images 808 and 812 at points 806 and 810 along the attendance timeline. The user is thus able to readily ascertain that the precipitous decline in participant attendance began when the image 812 was being presented and discussed by a particular presenter.

The generation and presentation of contextual online interaction timelines according to embodiments described herein can be readily distinguished from the mere presentation of thumbnails at standardized time or frame increments (e.g., every n seconds or minutes, or every m frames), as one might find when viewing a video published by an online service such as Youtube. In the latter scenario, for example, no thumbnails provided for display are selected dynamically and responsively to measures of online interactivity in alignment with points in time along an online interaction timeline, wherein the images provided for display are representative of content presented to participants at respective point in time.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method, comprising:
acquiring time stamped snapshot images of content visually presented to at least one participant in an online interaction, wherein the online interaction comprises a presentation provided by one or more presenters;
determining an aggregated number of participant interactions for a plurality of participants in the online interaction with respect to time;
determining an aggregated number of participants attending the online interaction with respect to time;
generating a timeline report by plotting a first timeline of the aggregated number of participant interactions and a second timeline of the aggregated number of participants attending the online interaction;
providing, for display, a graphical representation of the timeline report comprising the first timeline of the aggregated number of participant interactions and the second timeline of the aggregated number of participants attending the online interaction;
identifying a plurality of points of interest corresponding to points in time during the online interaction based on user selection of at least one of the first timeline of the aggregated number of participant interactions or the second timeline of the plotted aggregated number of participants attending the online interaction; and in response to identifying the plurality of points of interest corresponding to the points in time during the online interaction, providing, for display, a plurality of images from the time stamped snapshot images of content visually presented to the at least one participant in the online interaction, wherein the plurality of images are representative of content of the presentation presented to participants at the points in time corresponding to the plurality of points of interest.

2. The method of claim 1, wherein determining the aggregated number of participant interactions for the plurality of participants in the online interaction comprises:

for each of the plurality of participants, determining a number of interaction points based on a status of a window displaying the online presentation to the participant with respect to time; and generating the aggregated number of participant interactions based on the determined number of interaction points for each participant.

3. The method of claim 2, wherein the user selection comprises hover input at a plurality of points along at least one of the first timeline of the aggregated number of participant interactions or the second timeline of the plotted aggregated number of participants attending the online interaction.

4. The method of claim 1, wherein providing, for display, the plurality of images from the time stamped snapshot images of content visually presented to the at least one participant in the online interaction further comprises:

aligning, on the timeline report, the plurality of images from the time stamped snapshot of images of content visually presented to the at least one participant in the online interaction with the corresponding points of interest.

5. The method of claim 1, wherein acquiring the time stamped snapshot images of content comprises:

hosting a context tracking application on a participant emulating computer;

connecting the participant emulating computer to the online interaction; and capturing the time stamped snapshot images of content via the context tracking application hosted on the participant emulating computer.

6. The method of claim 5, wherein acquiring the time stamped snapshot images of content comprises:

accessing a recording of the online interaction; and extracting the time stamped snapshot images of content from the recording of the online interaction.

7. The method of claim 1, wherein acquiring the time stamped snapshot of images of content comprises at least one of:

acquiring the time stamped snapshot of images at regular intervals; or acquiring the time stamped snapshot of images at each transition between a prior image and a subsequent image presented to the at least one participant in the online interaction.

8. An apparatus for generating a contextual timeline of online interactions for use in assessing effectiveness comprising:

at least one processor; and a non-transitory computer readable storage medium comprising instructions that, when executed by the at least one processor, cause the apparatus to:

acquire time stamped snapshot images of content visually presented to at least one participant of a plurality of participants in an online interaction, wherein the online interaction comprises a presentation provided by one or more presenters;

determine an aggregated number of participant interactions for the plurality of participants in the online interaction with respect to time;

determine an aggregated number of participants attending the online interaction with respect to time;

generate a timeline report by plotting a first timeline of the aggregated number of participant interactions and a second timeline of the aggregated number of participants attending the online interaction;

provide, for display, a graphical representation of the timeline report comprising the first timeline of the aggregated number of participant interactions and the second timeline of the aggregated number of participants attending the online interaction;

identify a plurality of points of interest corresponding to points in time during the online interaction based on user selection of the timeline report; and in response to identifying the plurality of points of interest corresponding to the points in time during the online interaction, provide, for display with the timeline report, a plurality of images from the time stamped snapshot images of content visually presented to the at least one participant in the online interaction, wherein the plurality of images are representative of content of the presentation presented to participants at the points in time corresponding to the plurality of points of interest.

9. The apparatus of claim 8, wherein the timeline report plots the first timeline of the aggregated number of participant interactions and the second timeline of the aggregated number of participants in the online interaction within a graph.

10. The apparatus of claim 9, wherein the user selection comprises hover input at a plurality of points along the timeline report.

11. The apparatus of claim 8, further comprising instructions that, when executed by the at least one processor, cause the apparatus to:

determine at least one identity of at least one speaker in the online presentation at the points in time corresponding to the points of interest; and in response to identifying the plurality of points of interest, displaying on the timeline report the at least one identity of the at least one speaker in the online presentation at the points in time corresponding to the points of interest and the plurality of images from the time stamped snapshot images representative of content of the presentation presented to the plurality of participants at the points in time corresponding to the plurality of points of interest.

12. The apparatus of claim 8, further comprising instructions that, when executed by the at least one processor, cause the apparatus to acquire the time stamped snapshot images of content by:

hosting a context tracking application on a participant emulating computer;

connecting the participant emulating computer to the online interaction; and capturing the time stamped snapshot images of content via the context tracking application hosted on the participant emulating computer.

13. The apparatus according to claim 8, further comprising instructions that, when executed by the at least one processor, cause the apparatus to determine the aggregated number of participant interactions by:
for each of the plurality of participants, determining a number of interaction points based on a status of a window displaying the online presentation to the participant with respect to time; and
generating the aggregated number of participant interactions based on the determined number of interaction points.

14. The apparatus of claim 8, further comprising instructions that, when executed by the at least one processor, cause the apparatus to acquire the time stamped snapshot of images of content by performing at least one of:
acquiring the time stamped snapshot of images at regular intervals; or
acquiring the time stamped snapshot of images at each transition between a prior image and a subsequent image presented to the at least one participant in the online interaction.

15. A non-transitory computer readable medium for storing computer instructions that, when executed by at least one processor, cause a computer system to perform a steps of generating contextual timelines for online interactions for use in assessing effectiveness, comprising:
acquiring time stamped snapshot images of content visually presented to at least one participant in an online interaction, wherein the online interaction comprises a presentation provided by one or more presenters;
determining an aggregated number of participant interactions for a plurality of participants in the online interaction with respect to time;
determining an aggregated number of participants attending the online interaction with respect to time;
generating a timeline report by plotting a first timeline of the aggregated number of participant interactions and a second timeline of the aggregated number of participants attending the online interaction;
providing, for display, a graphical representation of the timeline report comprising the first timeline of the aggregated number of participant interactions and the second timeline of the aggregated number of participants attending the online interaction;
identifying a plurality of points of interest corresponding to points in time during the online interaction based on user selection of at least one of the first timeline of the aggregated number of participant interactions or the second timeline of the plotted aggregated number of participants attending the online interaction; and
in response to identifying the plurality of points of interest corresponding to the points in time during the online interaction, providing, for display, a plurality of images from the time stamped snapshot images of content visually presented to the at least one participant in the online interaction, wherein the plurality of images are representative of content of the presentation presented to participants at the points in time corresponding to the plurality of points of interest.

16. The non-transitory computer readable medium of claim 15, wherein the timeline report plots the first timeline of the aggregated number of participant interactions and the second timeline of the aggregated number of participants attending the online interaction within a graph.

17. The non-transitory computer readable medium of claim 16, wherein the user selection comprises hover input at a plurality of points along the timeline report.

18. The non-transitory computer readable medium of claim 15, further comprising instructions that, when executed by the at least one processor, cause the computer system to provide, for display, the plurality of images from the time stamped snapshot images of content visually presented to the at least one participant in the online interaction further by: aligning, on the timeline report, the plurality of images from the time stamped snapshot of images of content visually presented to the at least one participant in the online interaction with the corresponding points of interest.

19. The non-transitory computer readable medium of claim 15, further comprising instructions that, when executed by the at least one processor, cause the computer system to acquire the time stamped snapshot images of content by:
hosting a context tracking application on a participant emulating computer;
connecting the participant emulating computer to the online interaction; and
capturing the time stamped snapshot of images of content via the context tracking application hosted on the participant emulating computer.

20. The method of claim 19, further comprising instructions that, when executed by the at least one processor, cause the computer system to acquire the time stamped snapshot of images of content by:
acquiring the time stamped snapshot of images at regular intervals; or
acquiring the time stamped snapshot of images at each transition between a prior image and a subsequent image presented to the at least one participant in the online interaction.

* * * * *